June 22, 1954 — R. E. WEAVER — 2,681,692
TRUCK TIRE REMOVING PRESS
Filed Feb. 25, 1952

INVENTOR,
ROBERT. E. WEAVER,
BY *(signature)*
ATTORNEY.

Patented June 22, 1954

2,681,692

UNITED STATES PATENT OFFICE 2,681,692

TRUCK TIRE REMOVING PRESS

Robert Edgar Weaver, Zeigler, Ill.

Application February 25, 1952, Serial No. 273,163

2 Claims. (Cl. 157—1.2)

This invention pertains to apparatus for handling tires of heavy vehicles such as trucks and busses, which tires are usually too stiff to manipulate with ordinary hand tools.

An object of this invention is to provide an apparatus which is easily and quickly manipulated, whereby such a tire may be removed from the wheel rim in a simple and expeditious manner.

Generally stated, the invention provides a pair of pressure spiders having arms adjustable radially so that their tips may be positioned to engage a tire or rim of any usual size. One of these is arranged to support the rim while the other engages the tire on the opposite side. The two spiders are then moved toward each other, whereby the tire is stripped from the rim. Fluid-pressure actuating and control means are provided for adjusting and locking the spiders and for moving them relatively, whereby very rapid operation may be attained.

Figure 1:
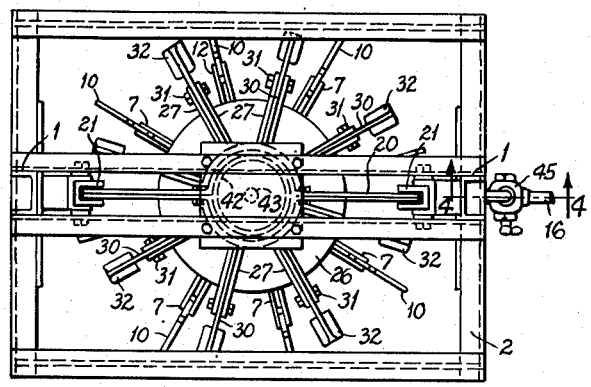
Figure 2:
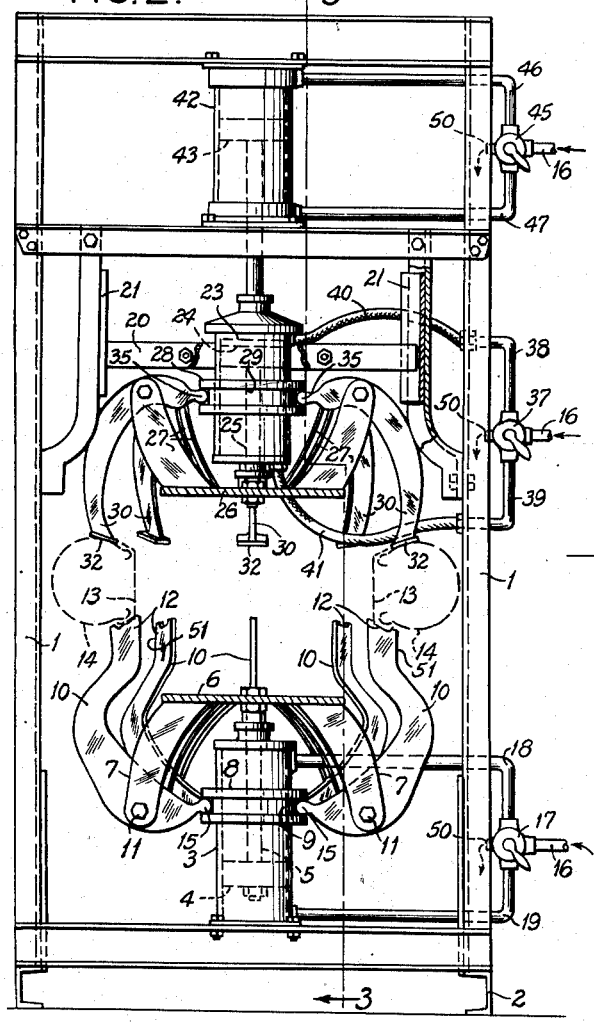
Figure 3:
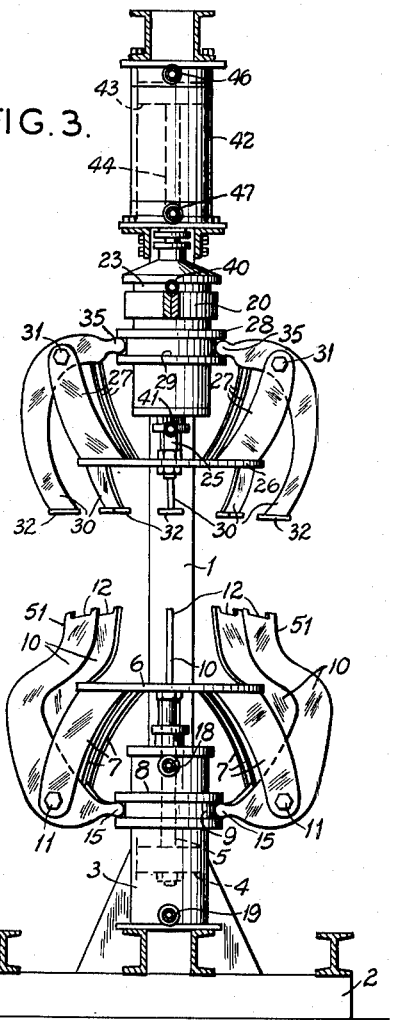
Figure 4:
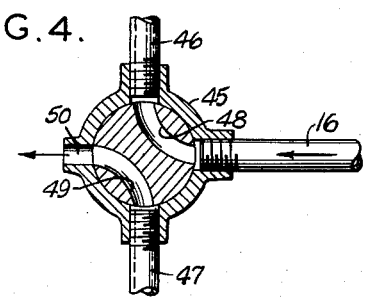

A preferred embodiment of this invention is illustrated in the accompanying drawing, in which Figure 1 is a plan view of a tire removing press embodying this invention, Figure 2 is a view of the same in front elevation, Figure 3 is a section on line 3—3 of Fig. 2, and Figure 4 is an enlarged section on line 4—4 of Fig. 1.

Referring to the drawing, 1 designates an upright frame for the press, which frame may be mounted on any suitable type of base 2. Mounted in upright position on the base 2 is a fluid-pressure cylinder 3 having movable therein a piston 4 provided with a piston rod 5. Secured on the rod 5 is a head 6 having formed thereon or secured thereto a series of pivot supports 7. The cylinder 3 has mounted or formed thereon a pivot ring 8 having a pivot groove 9. A series of bell-crank members 10 are pivoted each to one of the pivot supports 7 by a pivot pin 11. The longer arm of each of these bell-cranks extends upward, terminating in a tip 12 adapted to receive the wheel rim 13 from which the tire 14 is to be removed. The shorter arm of the bell-crank extends substantially horizontally and terminates in a rounded head 15 which enters the groove 9 to provide a pivotal connection with the ring 8.

The cylinder 3 is connected to a source 16 of pneumatic or hydraulic pressure supply through a valve 17, a duct 18 leading to the upper portion of the cylinder above the piston 4, and a duct 19 leading to the lower portion of the cylinder. As will be more fully described hereinafter, the valve 17 may be manipulated to raise or lower the piston 4 thereby changing the relative positions of the pivots 11 and 15 and contracting or spreading the tips 12 to adjust them to fit any rim 13.

Mounted on a sub-frame 20 vertically slidable in ways 21 on the frame 1 is a cylinder 23, similar in all respects to the cylinder 3, having a piston 24, a piston rod 25 provided with a head 26 carrying pivot supports 27. This cylinder is also provided with a pivot ring 28 having a groove 29. The upper spider is formed by a series of bellcranks 30 pivoted at 31 to the supports 27 and having rounded heads 35 engaging the groove 29. This cylinder is supplied with the same pressure source 16 through a valve 37. A duct 38 leads from the valve 37, through a flexible connection 40 to the upper portion of the cylinder 23, and a similar duct 39 and flexible connection 41 leads to the lower portion thereof.

Mounted on the upper part of the frame 1 is a cylinder 42 having a piston 43 and piston rod 44 on which the cylinder 23 and its connected spider are supported. The cylinder 42 is also connected to the source 16 through a valve 45 and ducts 46 and 47.

The valves 17 and 37 are identical in construction with the valve 45 illustrated in section in Fig. 4. Here the plug portion has two passages 48 and 49. In the position shown the passage 48 connects the source 16 with the duct 46 leading to the top of the cylinder, and the passage 49 connects the duct 47 with an exhaust port 50. This position of the valve will cause the piston 43 to move downward. Turning the valve 90 degrees in either direction will cause one of said passages to connect duct 47 with the source 16, and duct 46 with the exhaust port 50, thereby causing the piston 43 to move upward. The valves 17 and 37 control their cylinders in exactly the same way.

In operation the valve 17 is manipulated to spread or contract the tips 12 to fit the rim 13 which is then placed thereon for support. The valve is then turned to a position 45 degrees from that of Figure 4 in which position all ports of the valve are shut off and the piston 4 is locked in its adjusted position. The valve 37 is then manipulated to adjust the tips 32 to fit against the tire 14 outside of the rim 13. This valve is then also turned 45 degrees to lock the piston 24. When these adjustments have been made the valve 45 may be manipulated to move the piston 43 downward, and with it the cylinder 23 and the upper spider formed by the arms 30. This spider then forces the tire 14 downward, stripping it from the rim 13. In passing off the rim the tire is received by vertical straight portions 51 of the arms 10 and held thereby until the rim 13 can be removed from the tips 12, after which the tire may also be removed.

It will be seen that this invention provides a device whereby a tire may be removed in a convenient manner and very quickly. The power means for adjusting the spiders are very rapid since all the arms are adjusted simultaneously. The complete operation requires only three manipulations of the control valves and the stripping pressure applied to the tire is always under complete control.

Various changes may be made in the details of construction, within the scope of the appended claims, without departing from the spirit of this invention. Parts of the invention may be used without the whole and improvements may be added while retaining some or all of the advantages of the invention.

I claim:

1. In a tire press of the character described, a frame, upper and lower spiders mounted on said frame, each of said spiders comprising a pressure cylinder having a plunger, a pivot ring on said cylinder having a circumferential groove, a head on said plunger, pivot supports spaced circumferentially on said head having pivots located opposite said pivot ring, and bellcranks on said pivots having heads engaging said groove and opposite tips engageable respectively with a wheel rim and a tire thereon, said cylinder and plunger being adjustable relatively to adjust said tips to the rim or tire, one of said spiders being movable on said frame, and a pressure unit on said frame connected to said movable spider to move the same to strip a tire from its rim.

2. In a tire press of the character described, a spider comprising, a pressure cylinder having a plunger, a pivot ring on said cylinder having a circumferential groove, a head on said plunger, pivot supports spaced circumferentially on said head and having pivots located opposite said pivot ring, bellcranks on said pivots having heads engaging said groove and opposite tips engageable with a rim or tire, and control means supplying pressure fluid to said cylinder to move said plunger relatively thereto to adjust said tips.

References Cited in the file of this patent

UNITED STATES PATENTS

| Number | Name | Date |
| --- | --- | --- |
| 560,354 | Hain | May 19, 1896 |
| 1,578,760 | Replogle | Mar. 30, 1926 |
| 1,948,434 | Stafford et al. | Feb. 20, 1934 |
| 2,423,652 | Kelley | July 8, 1947 |
| 2,479,432 | Tillotson | Aug. 16, 1949 |